Aug. 1, 1950     M. J. BARONE     2,516,946
HEDGE TRIMMING SHEARS
Filed Dec. 16, 1947
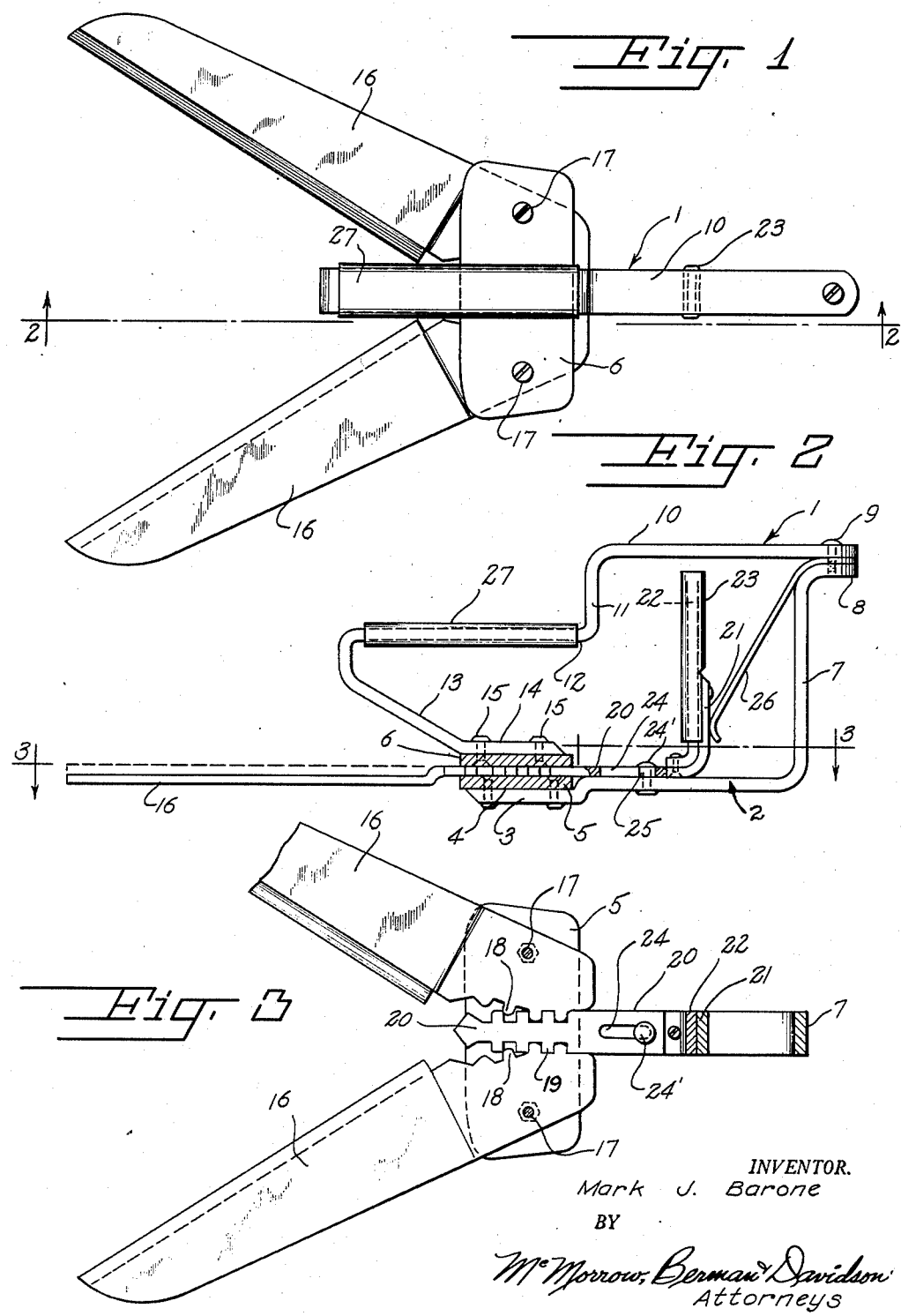
INVENTOR.
Mark J. Barone
BY
McMorrow, Berman & Davidson
Attorneys Patented Aug. 1, 1950

2,516,946

UNITED STATES PATENT OFFICE 2,516,946

HEDGE TRIMMING SHEARS

Mark J. Barone, West Orange, N. J.

Application December 16, 1947, Serial No. 791,948

2 Claims. (Cl. 30—245)

The present invention is directed to improvements in shears particularly designed for trimming hedges, but is not necessarily limited to such use.

The primary object of the invention is to provide a device of this kind, constructed in such manner that the user can grasp conveniently with one hand a handhold and with the other manipulate a handle to swing the blades during the use of the device.

Another object of the invention is to provide a device of this nature so constructed that the blades can be rapidly swung during the cutting operation with very little effort on the part of the user.

With these and other objects in view, this invention resides in the novel features of construction, formation, combination and arrangement of parts to be hereinafter more fully described, claimed and illustrated in the accompanying drawings, in which:

Figure 1 is a top plan view.

Figure 2 is a sectional view on line 2—2 of Figure 1.

Figure 3 is a sectional view on line 3—3 of Figure 2.

Referring to the drawings, a frame is designated generally by the numeral 1, said frame including a main bar 2, the forward end of which is offset, as at 3, constituting a seat 4 adapted to support a transversely disposed bottom plate 5.

A similar top plate 6 is provided and is disposed in spaced relation with the bottom plate, as clearly shown in Figure 2.

The rear end of the bar 2 terminates in a vertical bar 7, which has its upper end terminating in a horizontal offset 8, and to which is connected by a bolt 9, the rear end of the bar 10.

The handle bar 10 is bent downwardly, as at 11, to provide a horizontal bar 12, the forward end terminating in a downwardly and reversely bent bar 13, the foot 14 thereof being riveted, as at 15 to the upper plate 6.

Obviously, the plates 5 and 6 will be maintained in vertical spaced relation, the purpose of which will later be apparent.

The cutting blades 16, 16 are pivotally connected in the space between the plates 5 and 6 by bolts 17, 17, said blades having their rear ends spaced apart, as clearly shown in Figure 3. The confronting edges of the rear ends of the blades are formed with teeth 18 adapted to mesh with the teeth 19 formed in the oposite sides of the blade-actuating bar 20 slidable in the space between the plates 5 and 6.

The rear end of the bar 20 terminates in a vertical extension 21 and fixed thereto is a bar 22 and upon which is mounted a rubber sleeve 23 in order that it can be comfortably gripped by the fingers of the operator.

The bar 20 has formed therein a longitudinal slot 24, there being a bolt 24' carried by the main bar 2 which enters said slot and has rotatable thereon a spacing ring 25. Fixed between the rear end of bar 10 and off-set 8 is the upper end of a spring arm 26, the lower end of which bears against the rear face of the extension 21.

A rubber sleeve 27 is engaged on the downwardly bent section of the bar 11, and constitutes a hand grip.

Briefly, the operation is as follows:

The operator grasps the sleeve 27 with the left hand and the bar 7 with the right hand at which time the fingers of the right hand grip the sleeve 23. Upon exerting pressure on the sleeve 23 in a rearward direction the spring arm 26 will yield rearwardly. Obviously, as the bar 20 moves rearwardly, the intergaging teeth 18 and 19 will cause the blades to swing toward each other to perform the cutting operation. After this operation has been performed and pressure is released on the sleeve 23 the tension on the spring arm 26 will then act to slide the bar 20 forwardly in order that the co-acting teeth 18 and 19 will function to swing the blades to open position.

It will thus be seen that the sleeve 23 operates somewhat in the manner of a trigger, and can be manipulated easily and quickly.

What is claimed:

1. A hedge trimmer of the kind described comprising a pair of spaced apart plates, a pair of coacting cutting members each having one end pivotally mounted on one end between said plates, confronting teeth on said cutting members, an actuating bar, teeth on said bar engaging said teeth upon said cutting members, a supporting frame fixed on said spaced apart plates, and means slidably supporting said plate actuating bar on said frame for rocking said cutting members upon sliding of said actuating bar.

2. A hedge trimmer of the kind described comprising a frame including a pair of spaced horizontal bars and a vertical bar fixed between said horizontal bars at the rear end thereof, a plate fixed on the forward end of said horizontal bars transversely thereof disposed in spaced apart relation, a pair of coacting cutting members pivotally mounted between said plates, confronting teeth on said cutting members, an actuating bar slidable on one of said horizontal bars and having teeth engaging the teeth of said cutting members, a handle on said actuating bar, and a resilient member engaging between said vertical bar and said handle for constantly urging said cutting members divergingly apart.

MARK J. BARONE.

REFERENCES CITED

The following references are of record in the file of this patent:

UNITED STATES PATENTS

| Number | Name | Date |
|---|---|---|
| 216,537 | Skinner | June 17, 1879 |
| 941,831 | Widmann | Nov. 30, 1909 |
| 1,860,594 | Pettit | May 31, 1932 |